US010410276B2

(12) United States Patent
Vippagunta et al.

(10) Patent No.: US 10,410,276 B2
(45) Date of Patent: Sep. 10, 2019

(54) INTEGRATING SOCIAL NETWORKING SYSTEMS WITH ELECTRONIC COMMERCE SYSTEMS FOR GIFT CAMPAIGNS

(71) Applicant: Amazon Technologies, Inc., Seattle, WA (US)

(72) Inventors: Rajendra K. Vippagunta, Issaquah, WA (US); James J. Massey, Issaquah, WA (US); Anand Subbarayan, Bellevue, WA (US); Anand D. Paka, Seattle, WA (US); Shrinivas Mohan, Seattle, WA (US); Sarthak Anand, Seattle, WA (US); Aditya Rekha Dharanipragada, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 888 days.

(21) Appl. No.: 14/869,473

(22) Filed: Sep. 29, 2015

(65) Prior Publication Data
US 2016/0019630 A1    Jan. 21, 2016

Related U.S. Application Data

(62) Division of application No. 12/978,711, filed on Dec. 27, 2010, now Pat. No. 9,152,992.

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0633* (2013.01); *G06Q 30/0613* (2013.01); *G06Q 30/0631* (2013.01); *G06Q 50/01* (2013.01)

(58) Field of Classification Search
CPC ........................................ G06Q 30/0601–0645
(Continued)

(56) References Cited

U.S. PATENT DOCUMENTS 8,095,432 B1 * 1/2012 Berman ............. G06Q 30/0631
705/26.7
2002/0042775 A1    4/2002 Nelson et al.
(Continued)

OTHER PUBLICATIONS

Friendster Launches Virtual Gifts and the Friendster Gift Shop. (Oct. 29, 2009). AsiaPulse News Retrieved from https://dialog.proquest.com/professional/docview/678344922?accountid=142257.*

(Continued)

*Primary Examiner* — Resha Desai
(74) *Attorney, Agent, or Firm* — Thomas Horstemeyer, LLP

(57) ABSTRACT

Disclosed are various embodiments for facilitating gift campaigns in association with a social networking system. A computing device may identify a user of a social networking system that is associated with a recipient for a gift campaign. An invitation for the user to participate in the gift campaign can be transmitted by the computing device. The computing device may identify a product as a suggested gift for the gift campaign. In addition, the computing device may generate content for a network page for the social networking system, and the network page can include a user interface container in which the product is represented. The computing device may also obtain a selection of the product made via the network page and perform a transaction to order the product for the recipient.

20 Claims, 10 Drawing Sheets

(58) Field of Classification Search
USPC .............................................. 705/26.1–27.2
See application file for complete search history.

(56) References Cited

U.S. PATENT DOCUMENTS

2004/0051740 A1\* 3/2004 Reichel ..................... G06F 9/54
715/789
2009/0259524 A1\* 10/2009 Rozenkrants ........ G06Q 10/101
705/35

OTHER PUBLICATIONS

Tanner, L. (2000). Tiethebow.com takes gift shopping to a new level. Dallas Business Hournal, 23(21), 10. Retrieved from http://search.proquest.com/docview/228428505?accountid=14753.

\* cited by examiner ly relevant aspects of the subsequent discussion are provided for purposes of illustration and not as a limitation. First, a general description of several embodiments of a system is provided, followed by a discussion of the operation of the same.

INTEGRATING SOCIAL NETWORKING SYSTEMS WITH ELECTRONIC COMMERCE SYSTEMS FOR GIFT CAMPAIGNS

CROSS REFERENCE TO RELATED APPLICATIONS

This application is a divisional of, and claims priority to, U.S. application Ser. No. 12/978,711, titled "GIFT CAMPAIGNS IN A SOCIAL NETWORKING SYSTEM," filed on Dec. 27, 2010, which is incorporated by reference herein in its entirety.

BACKGROUND

Users of a social networking system may desire to give gifts to other users with whom they are linked and/or connected. Many social networking systems do not provide integration with an electronic commerce system. Initiators and/or participants of a gift campaign may be unaware of the scope of a recipient's network of friends and/or acquaintances. Initiators or participants may also need assistance with suggestion and/or selection of a gift to give to a recipient.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. Users are often linked as friends, acquaintances, and/or by a common interest and/or interest group in a social networking system. As discussed herein, a social networking system can also include any type of virtual user community, blogging service, microblogging service, etc., in which a user has an identity. Users may wish to initiate gift campaigns where a gift is made to a recipient, and where the gift campaign invites and involves participation from a number of other users to which the recipient is linked in some way via the social networking system. Users may also wish to be reminded of upcoming events associated with other users to whom they are linked for which a gift campaign may be appropriate, such as a birthday, anniversary, etc. Embodiments of the present disclosure can facilitate a gift campaign on behalf of a gift recipient. Embodiments of the disclosure can also facilitate collection of funds from the various participants of the gift campaign as well as facilitate fulfillment of a gift (e.g., a product) from an electronic commerce system on behalf of the recipient.

Figure 1:
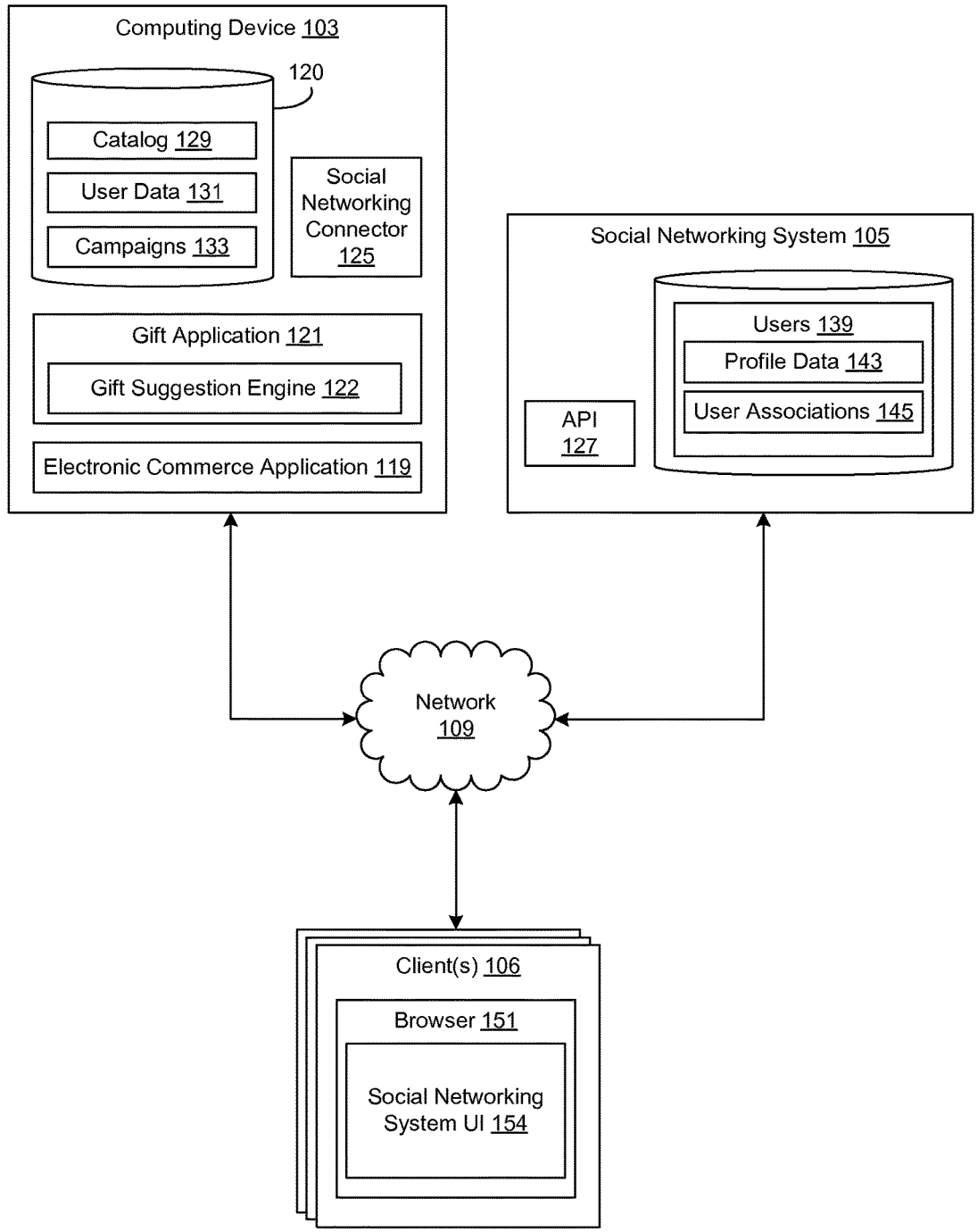
FIG. 1 is a drawing of a networked environment according to various embodiments of the present disclosure.

With reference to FIG. 1, shown is a networked environment 100 according to various embodiments. The depicted networked environment 100 illustrates one example of an implementation of a system according to an embodiment of the disclosure. It should be appreciated that embodiments of the disclosure can be implemented in various ways. The networked environment 100 includes at least one computing device 103, a social networking system 105, and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above. Additionally, the social networking system 105 can also be implemented in one or more computing devices.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include an electronic commerce application 119, a gift application 121, social networking connector 125 and other applications, services, processes, systems, engines, or functionality not discussed in detail herein. The gift application 121 is executed to facilitate gift campaigns in a social networking system 105 on behalf of an initiator of the gift campaign. The gift application 121 can facilitate selection of users of the social networking system for participation in a gift campaign, collection of funds, selection of a product as a gift, as well as completing a transaction in an electronic commerce system to fulfill the product to the recipient of a gift campaign. The gift application 121 can also execute a gift suggestion engine 122 that can facilitate the suggestion of products available via an electronic commerce system that can be purchased for the recipient on behalf of a gift campaign.

The social networking connector 125 can facilitate communication with an application programming interface 127 provided by the social networking system 105. The social networking connector 125 can facilitate implementing an application within a social networking system 105 framework. For example, a social networking system 105 can provide an application programming interface (API) with which users or other entities can develop applications. The API can, subject to authorization of a user, expose various functionality of a social networking system 105 to applications using the API, such as access to information about users, their friends, interests, images, videos, etc. In one embodiment, the social networking system 105 can provide a container within a user interface generated by the social networking system 105 with which an application can, via the API 127, populate content in a social networking user interface. In this way, the gift application 121 and/or electronic commerce system 119 can, via the social networking connector 125 and the API 127, display content in a user interface generated by the social networking system 105.

In some embodiments, the functionality of the gift application 121, the gift recommendation engine 122 and/or social networking connector 125 may be included in the electronic commerce application 119. In other embodiments, the gift application 121, gift recommendation engine 122 and/or social networking connector 125 may be executed as a sub-module of the electronic commerce application 119, or as a separate, standalone application, etc. It should be understood that the depicted embodiment of an electronic commerce application 119, the gift application 121, gift recommendation engine 122 and/or the social networking connector 125 is but one example. In other embodiments, gift campaigns can be facilitated by the gift application 121 among users of an electronic commerce application 119 without interacting with a social networking system 105. The depicted embodiments illustrating interactions with users of the social networking system 105 and connections of the users in the social networking system 105 are merely examples.

Also, the computing device 103 can include at least one data store 120, which may comprise data and applications operable to provide access to the data stored therein. It should be appreciated that the data store 120 may or may not reside within a computing device 103, but may be accessible via a network to the computing device 103. The data store 120 can include a catalog 129, which can include various information about products available via an electronic commerce system facilitated by the computing device 103. The catalog 129 can include information about products, such as, but not limited to, product descriptions, product keywords, categories, stock keeping unit, product search terms and other information or meta data as can be appreciated.

The data store 120 can also include user data 131, which can store information about users of an electronic commerce system facilitated by the electronic commerce application 119 and/or the computing device 103. User data 131 can include, for example, user profile data, which can include demographic information about a user, shipping addresses, telephone numbers, payment information, e-mail addresses, purchasing history, product browsing history, affinity groups with which the user is affiliated, and other data related to users. User data 131 can also include marketing information that is imported into the data store 120 such as from a marketing database. As will be described in further detail herein, the gift recommendation engine 122 can generate gift recommendations by leveraging the data about users of the social networking system 105, the gift application 121 and/or electronic commerce application 119.

The data store 120 can also store data about gift campaigns 133. The data store 120 can house information about an initiator, recipient and/or participants of a campaign 133. Campaign 133 data can also include information about one or more products that are potential gifts for the recipient, information about funds collected from the initiator and/or participants, and other data that will be described in more detail herein. The data store 120 can also store one or more identifiers with which the campaign can be identified. In this way, the gift application 121 can facilitate fulfillment of a product for the recipient on behalf of a gift campaign by generating orders on behalf of the gift campaign identifier rather than on behalf of any particular customer. It should be appreciated that the depicted data store 120 and the table structure shown therein is but one example given for ease of depiction and explanation of various embodiments of this disclosure.

The social networking system 105 can include any type of user community, a microblogging service, etc. A user of the social networking system can have an identity and interact with other users of the social networking system, publish content, and take advantage of other functionality generally found within a social networking system. Users can have a direct connection to other users. In one embodiment, a user can establish a direct connection within a social networking system 105 with another user who is considered a friend. Users of the social networking system can also have an affiliation with a location, interest groups, topics, or other non-user entities. As one example, a user in a social networking system 105 can establish an association with a university or any other topic that interests the user and be connected with other users establishing the same association. As another example, a user in a social networking system can authorize transmission of their location to the social networking system 105, and the gift application 119 can invite users into a gift campaign based on their location as well as affiliation as well as the initiator, participant and/or recipient. Other variations should be appreciated, as should the general functionality of this and other examples of a social networking system 105.

A user of a social networking system 105 can publish content that can be viewable to other users linked to the user. In some social networking systems, for example, the content can be available to "friends," "followers" and/or users in the publisher's "network." As some examples, the user can publish text, images, video, and other media, which can be tagged with meta data, such as, but not limited to, the identity of people or objects within the media. In other words, a user can publish a "feed," which can be available to other users in the social networking system 105. Users can also be associated with a timeline and/or a news feed, which can, among other things, include information regarding other users with which they are associated in the social networking system 105. As some examples a timeline of a user can include information such as birthdays, anniversaries, and/or other events associated with other users with which the user has a connection. Accordingly, the social networking system 105 can also maintain a user data store 139, which can house information about the various users the social networking system 105. In the depicted example, the user data store 139 can store profile data 143 as well as user associations 145. Profile data 143 can include information that a user can define that describes the user's interests, likes, dislikes, and other demographic and biographical information. User associations 145 can include other users, topics, and/or interest groups with which a user is linked.

The client 106 is representative of a plurality of devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 151 and/or other applications. The browser 151 may be executed in a client 106, for example, to access and render network pages, such as web pages, or other content served up by the computing device 103 and/or other servers in which a social networking system user interface 154 can be rendered. The client 106 may be configured to execute applications beyond a browser 151 such as, for example, email applications, instant message applications, and/or other applications. Accordingly, in some embodiments a user can manipulate a user interface presented in the form of network pages shown on a display device via the browser 151 or other application that causes interaction with the social networking system 105 and/or computing device 103.

Another example of a client 106 that can interact with the social networking system 105 and/or computing device 103 includes a mobile device, which can execute a mobile application such as a browser that can render network pages generated by the social networking system 105 and/or computing device 103. In another embodiment, the mobile application can be tailored to access data provided by the social networking system 105 and/or computing device 103 and can include client side code that generates a user interface on a display device of the mobile device.

Now that a general description of one example of various components in a networked environment 100 have been given, some examples of the ways in which they can facilitate gift campaigns in a social networking system are given. In one embodiment, the gift application 121 can provide an application within the social networking system 105 that can allow a user acting as the initiator of the gift campaign to initiate the campaign on behalf of a recipient. In this example, the recipient can be another user in the social networking system 105 with which the initiator has a connection or affiliation. In some examples, a recipient can comprise more than one user in the social networking system 105 with which the initiator is affiliated. The gift application 121 can also identify and/or suggest additional users who can be invited as participants in the gift campaign.

The gift application 121 can also suggest potential recipients of a gift campaign to an initiator based on various attributes of a profile in a social networking system 105 associated with the initiator. In one example, the gift application 121 can retrieve data from a feed associated with a first user and detect, for example, an upcoming event such as birthday, anniversary, etc., of another user with which the first user is associated. The gift application 121 can then suggest that the first user initiate a gift campaign for the user associated with such an event. The gift application 121 can remind users of events associated with other users to whom they are linked via the social networking system 105, e-mail or other notification, and suggest that a gift campaign be initiated for the user. The initiator and participants can contribute funds towards the purchase of a gift (e.g., at least one product, a gift card, etc.) that can be fulfilled from an electronic commerce system on behalf of the gift campaign for the recipient.

In some embodiments, the initiator can select a product as well as designate a financial contribution that should be collected from the participants selected via the gift application 121. In other examples, the initiator can select a product as well as designate the gift campaign as a variable contribution campaign, where the amount contributed by the participants and/or the initiator depends on the number of users who commit funds to the campaign. In other embodiments, the initiator can allow participants to determine an amount that they are willing and/or able to contribute to a gift campaign. In another example, participants in a gift campaign can have voting input into the selection of one or more products to be fulfilled to the recipient as a gift.

To initiate a gift campaign on behalf of a user of a social networking system, an initiator can cause the gift application 121 to be executed via the social networking system 105. In one embodiment, the gift application 121 can provide one or more hyperlinks to users via the social networking system 105 API 127, which can allow the initiator to grant permission to gift application 121 to access personal details about the initiator's profile data 143 as well as user associations 145 in the social networking system 105. The gift application 121 can receive a request from the initiator of a user in the social networking system having a direct link to the user that is designated as a recipient of a gift campaign.

The gift application 121 can then provide user interface elements via the social networking system 105 that allow the user to select one or more participants that are users of the social networking system 105 who can be invited to participate in the gift campaign. Participants can be other users who have a connection in the social networking system 105 to the recipient and/or initiator. In some embodiments, the gift application 121 can generate suggested participants for the initiator in a user interface element in which the initiator selects participants to invite into the gift campaign. The various ways in which participants can be suggested are discussed in more detail with references to FIGS. 2-3 herein.

The gift application 121 can also allow a user to select one or more products to be purchased by or on behalf of the gift campaign and fulfilled on behalf of the recipient. In other words, the gift application 121 can facilitate fulfillment of one or more products as a gift for the recipient via an electronic commerce system. Accordingly, the gift application 121 can facilitate collection of funds from the initiator as well as the participants so that a gift can be purchased on behalf of the gift campaign using the funds.

In one embodiment, the initiator of a gift campaign can designate a fixed contribution amount to be collected from the various participants as well as from the initiator. The initiator can also specify a campaign length, or a deadline until which contributions will be accepted from invited participants. Accordingly, the gift application 121 can facilitate collection of funds from the various invited participants until the deadline. In one embodiment, the initiator can then select a product that can be purchased using the funds collected on behalf of the gift campaign, which can be purchased from and fulfilled by the electronic commerce application 119 for the recipient. The electronic commerce application 119 can then facilitate fulfillment of the product on behalf of the gift campaign to the recipient. The gift application 121 can also collect various forms of contributions to a gift campaign, such as, but not limited to cash, rewards points, and other examples as can be appreciated. These various forms of payment can be associated with an electronic wallet associated with a user.

In another embodiment, the initiator can designate the gift campaign as a variable contribution amount by selecting a total funds collection goal and/or selecting a product whose price is known, and the amount collected from the initiator and participants is dependent upon a total number of participants who commit to contribute funds to the gift campaign. In such an embodiment, the initiator can designate a maximum individual contribution amount that a participant can contribute, which can be reduced as the number of participants who commit funds to the campaign increases. In one example, the gift application 121 can perform a payment instrument authorization for the maximum individual contribution amount, such as a credit card authorization. Upon the passing of a deadline, when a final number of participants is known, the gift application 121 can then perform a payment instrument settlement for a contribution amount that is based upon the total number of participants including the initiator. In such a variable contribution gift campaign, the gift application 121 can also generate alternative gift suggestions if a contribution goal is not met or a sufficient amount is not collected to purchase a product initially selected by the initiator. The various ways in which gift suggestions can be generated are discussed in further detail below.

In another embodiment, the initiator can specify a contribution deadline, which can set a deadline for receiving commitments to contribute funds from participants in a gift campaign. Upon expiration of a contribution deadline, the gift campaign can close, and the amount collected from participants, whether a fixed amount, a variable amount, or an amount that can be selected by participants, can be used to purchase a product and/or a gift card via an electronic commerce system for the recipient on behalf of the gift campaign. The initiator can also specify a contribution goal, which can specify an amount which, if collected, can cause the campaign to close and a product purchased on behalf of the gift campaign for the recipient. A contribution goal can be based in part upon a price of a product selected by the initiator to be purchase for the recipient.

In other embodiments, the initiator can select more than one product choice that could be purchased with the funds collected on behalf of the gift campaign, and allow the participants to provide feedback or vote on a subset of these products that should be purchased on behalf of the gift campaign by the gift application 121 for the recipient. As one non-limiting example, the recipient can select three product choices that can be purchased with the funds collected from the participants, and the participants as well as the initiator can submit votes via a gift application in social networking system 105 regarding their product choices. The gift application 121 can also allow participants and/or the initiator to provide comments regarding the various choices, which can be published to other participants in the campaign. The gift application 121 can tabulate the votes from the participants and purchase the highest voted product.

As one variation of the above example, the gift application 121 can allow the initiator to select product choices for voting prior to the collection of funds, and then allow all potential participants to vote on a product choice prior to committing funds to the gift campaign via an application facilitated by the social networking system 105 API 127. In this example, the gift application 121 can also weight a participant's vote based at least upon whether the participant has committed funds to the gift campaign as well as a relative amount the user has committed in comparison to other participants.

The gift application 121 can also collect messages associated with a contribution of the initiator and/or participants that can be included in a gift notification that can in turn be provided to the recipient. As one example, the initiator and/or participants can provide a gift message intended for the recipient via the social networking system 105 in a user interface provided by the gift application 121. In one example, these gift messages can be collected by the gift application 121 and provided with a personalized message, an electronic greeting card, or other notification that is transmitted to the recipient via the social networking system, electronic mail, or other means as can be appreciated. In one embodiment, the recipient associated with a gift campaign can also claim a gift purchased by the gift application 121 on behalf of a gift campaign via a user interface provided by the gift application 121. As one example, if a gift campaign purchases an electronic gift card for a recipient, the recipient can claim the electronic gift card and associate the gift card with an account in an electronic commerce system.

Once the gift application 121 has facilitated collection of funds from the various participants and/or the initiator of a gift campaign, the gift application 121 can facilitate fulfillment of the product on behalf of the gift campaign for the recipient. In one embodiment, as noted above, the gift campaign can maintain an identifier that can be associated with the campaign in an electronic commerce system. The identifier can be associated with a customer that can be generated in the electronic commerce system and that represents the gift campaign. Accordingly, the funds collected by the gift application 121 from participants and/or the initiator can be associated with such an identifier, and a product can be purchased via the electronic commerce application 119 from the product catalog 129 on behalf of the gift campaign.

The gift application 121 can collect funds from participants and/or the initiator and associate the funds with a gift card or other type of account so that neither the initiator or the participants has ownership of the collected funds. In this way, the collected funds can be associated with the gift campaign separately from any account of the initiator and/or participant.

As noted above, the gift application 121 can execute a gift recommendation engine 122 that can generate gift recommendations for a recipient. In one embodiment, the gift recommendations can be based at least upon data that can be retrieved from the social networking system 105 about a recipient, participants and/or the initiator. More specifically, the gift application 121 can, via the API 127, retrieve profile data 143 associated with the recipient, participants and/or the initiator to generate gift recommendations. In one example, the gift application 121 can retrieve public profile information associated with a user and generate product recommendations having relevance to interest groups and/or topics with which the user is associated. As one example, if the gift application 121 can determine that the recipient is associated with a "basketball" interest group and/or topic in the social networking system 105, the gift application 121 can generate product suggestions from the catalog 129 that are relevant to basketball as gift suggestions that can be presented to the initiator and/or participants as choices for potential gifts. As another example, the gift application 121 can retrieve public profile information that reveals that a recipient "likes" a particular brand of product and generate product suggestions taken from the brand.

As another example, the gift application 121 can retrieve multimedia such as audio, images and/or video from the social networking system 105 that is associated with a recipient of a gift campaign. The gift application 121 can identify attributes of the multimedia associated with the recipient and identify products relevant to these attributes in the product catalog 129. As one example, the gift application 121 can identify an image in the social networking system published by the recipient and/or in which the recipient may be tagged and attempt to identify products available via the electronic commerce application 119 that are in the image. In one embodiment, the gift application 121 can perform edge recognition techniques to extract various objects from an image and/or frames of a video. Accordingly, the gift application 121 can then perform image recognition techniques to identify various objects extracted from an image and/or video frame, and match the objects with product imagery associated with products in the catalog 129.

As another example, the gift application 121 can perform an audio recognition analysis of audio and/or video published by the recipient and/or in which the recipient is tagged and attempt to identify products such as songs or any spoken words that may be relevant to products available via the electronic commerce application 119. As yet another example, the gift application 121 can attempt to identify meta data associated with multimedia that is published by the recipient in the social networking system 105 to identify a device that captured the multimedia (e.g. camera, mobile device, etc.). Accordingly, the gift application 121 can then recommend products that are related to the identified device as potential gifts. For example, if the gift application 121 can identify a particular camera that was used to capture multimedia published in the social networking system 105 by the recipient, it can recommend accessory products and/or updated versions of the camera as potential gifts.

Figure 2:
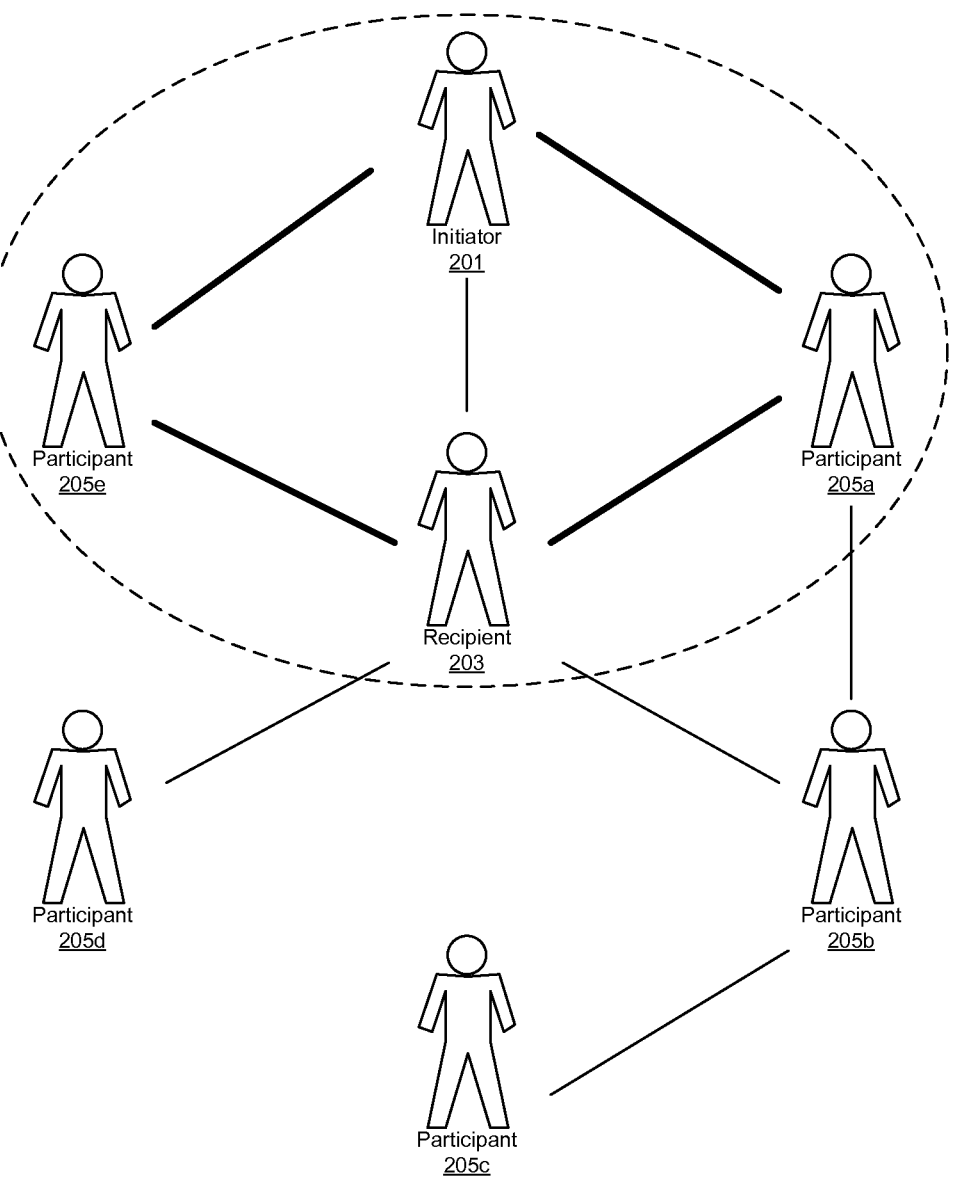
FIG. 2 is a drawing that depicts one way in which the gift application can identify participants in a gift campaign according to various embodiments of the present disclosure.
Figure 3:
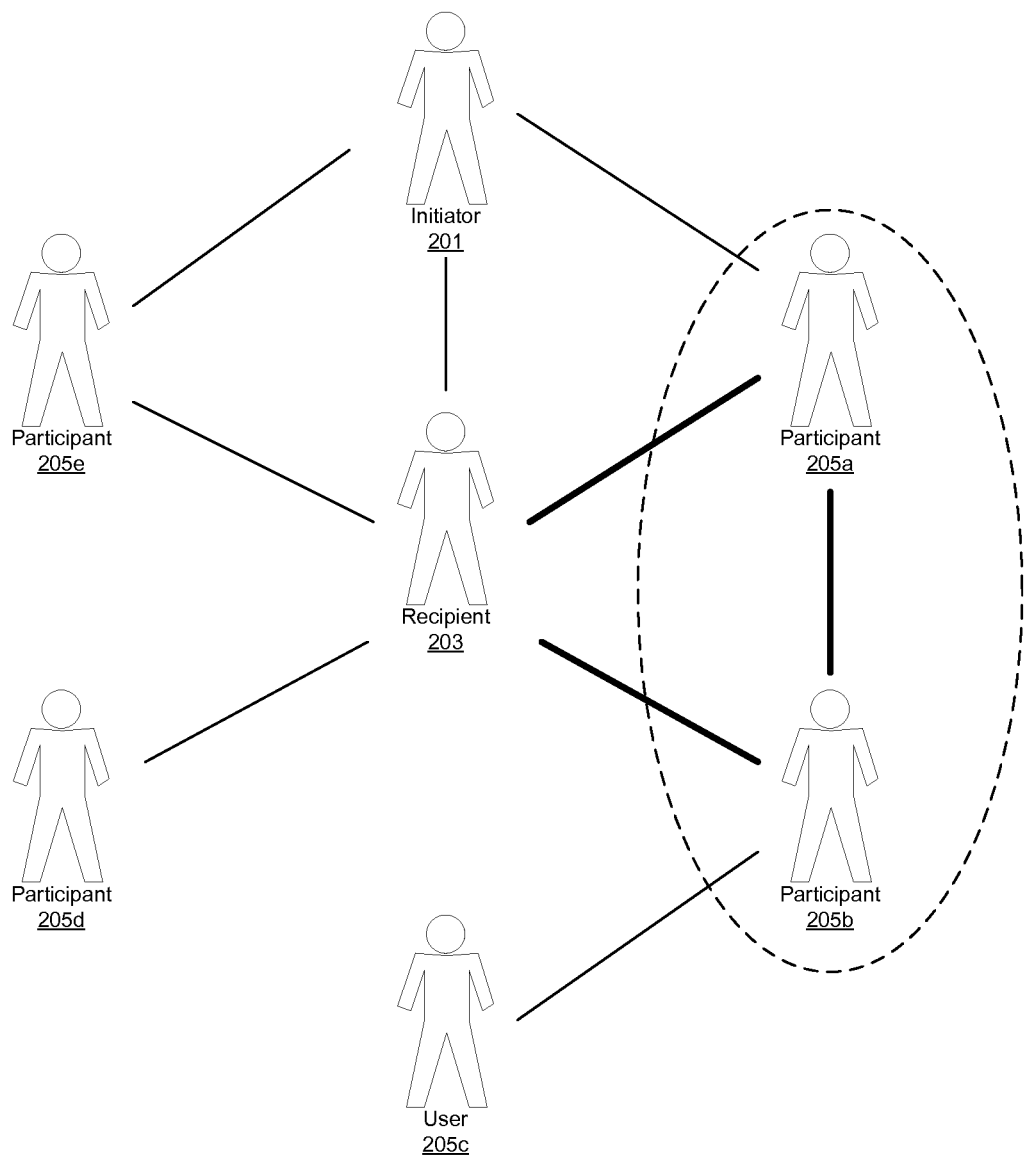
FIG. 3 is a drawing that depicts one way in which the gift application can identify participants in a gift campaign according to various embodiments of the present disclosure.

Reference is now made to FIGS. 2-3, which illustrate various ways in which participants for a gift campaign can be identified based at least upon their relationship in the social networking system 105 to the initiator 201 and/or recipient 203 of a gift campaign. FIG. 2 illustrates one non-limiting example of relationships between various users in a social networking system 105 according to various embodiments of the disclosure. In the depicted example, the gift application 121 can identify potential participants 205 for a gift campaign by identifying users by their user associations 145 in a social networking system 105 that indicate a direct linkage between the recipient and the initiator. In this way, in one example, the gift application 121 can identify "mutual friends" between the initiator and the recipient of a gift campaign, and these users can be invited as participants in a gift campaign. Such a direct linkage can also be identified based upon membership in an interest group, topic, or other aspect of a user that can identified in profile data 143 associated with the user in the social networking system 105 by the gift application 121. In some embodiments, the gift application 121 can provide the initiator of a gift campaign with various options and/or filters by which to limit the universe of users in the social networking system 105 who are potential participants in the campaign.

FIG. 3 illustrates one way in which the universe of potential participants 205 in a gift campaign can be expanded. In the depicted example, participants in a gift campaign can also extend invitations to join a gift campaign to other users in the social networking system 105 who may have a direct linkage to the recipient but not the initiator. In this way, users who may be unknown to the initiator 201 but are friends of the recipient can be identified as potential participants in a gift campaign. In the depicted example, participant 205a may extend an invitation to participant 205b to join the gift campaign. In one embodiment, the gift application 121 can limit the universe of users in the social networking system 105 to whom such an invitation can be extended by limiting the ability of participants to extend invitation to join a gift campaign to users who do not have a direct linkage to the recipient. Accordingly, in the depicted example, the gift application 121 can prevent the ability of participant 205b from extending an invitation to user 205c, as user 205c does not have a direct linkage to the recipient.

Figure 4:
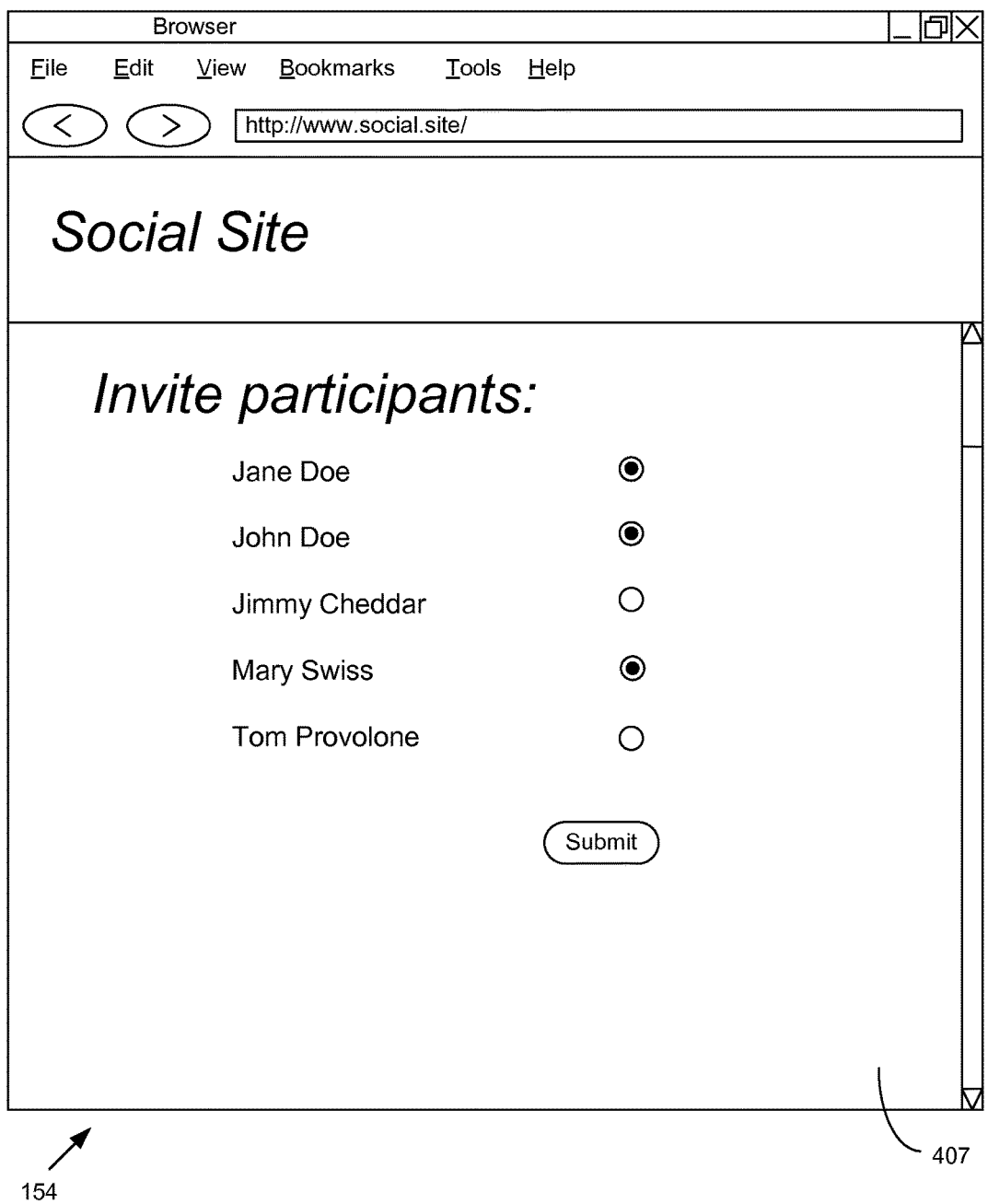
FIG. 4 is a drawing of an example of a social networking user interface rendered by a client in the networked environment of FIG. 1 according to various embodiments of the present disclosure.

FIG. 4 illustrates one example of a social networking system user interface 154 that can be generated by the social networking system 105 and gift application 121. FIG. 4 illustrates how a social networking system user interface 154 can include an application user interface 407 that includes content generated by the gift application 121 via the API 127 in the social networking system. In the depicted example, the social networking system 105 API 127 can provide a container within the social networking system user interface 154 that can be populated with content generated by the gift application 121 via the functionality supported by the API 127.

The depicted social networking system user interface 154 illustrates one example of a way in which the gift application 121 can facilitate the creation of a gift campaign by an initiator. In the depicted example, the gift application 121 can, via the social networking system 105 API 127, identify mutual friends, or users in the social networking system 105 who have a direct association with a recipient and the initiator. As described above, the gift application 121 can also allow participants in a gift campaign to invite users having a direct association with the recipient and a participant into the gift campaign. In this way, the gift application 121 can allow the initiator and/or participants in a gift campaign to expand the scope of users who may be included in the gift campaign.

Figure 5:
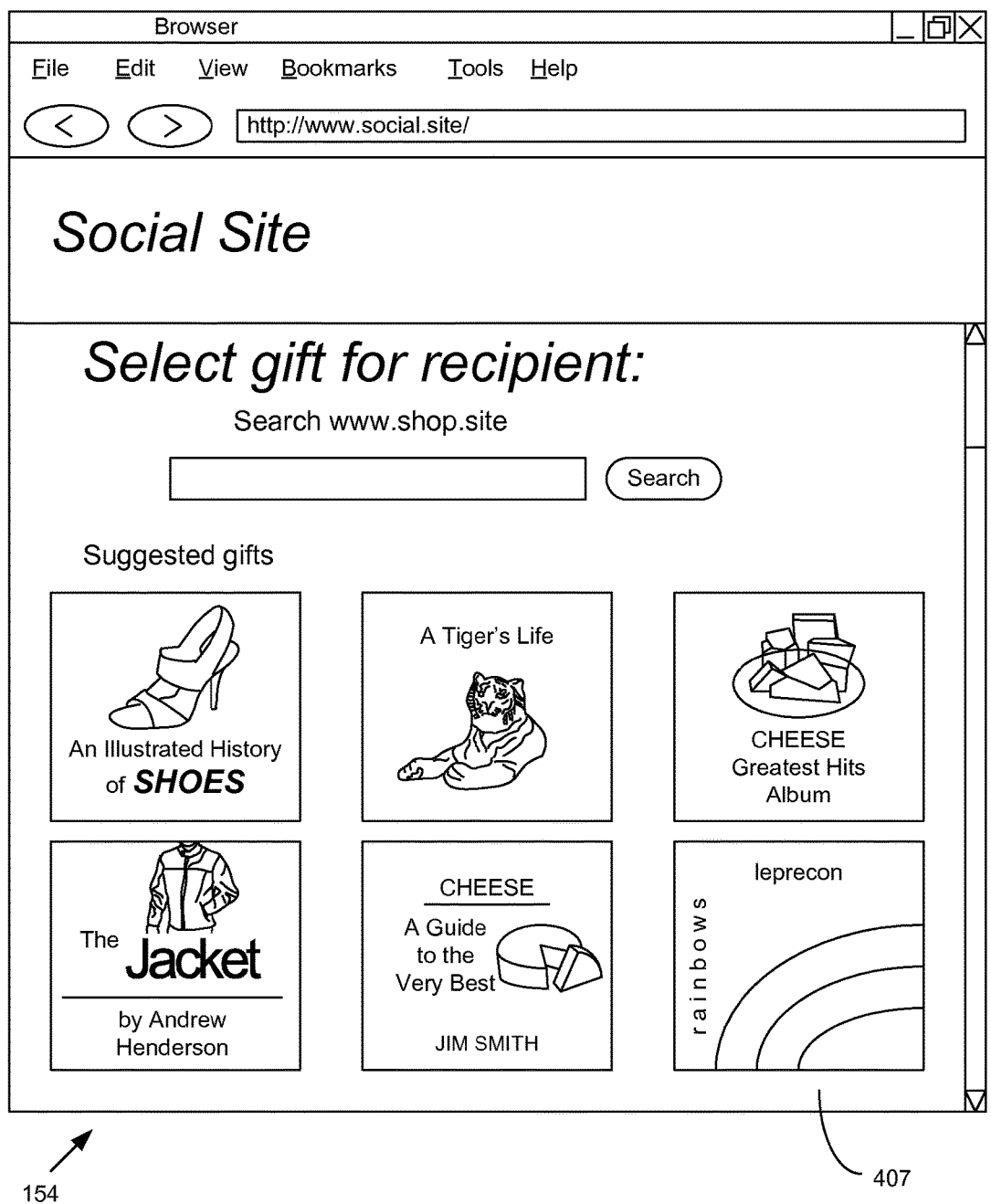
FIG. 5 is a drawing of an example of a social networking user interface rendered by a client in the networked environment of FIG. 1 according to various embodiments of the present disclosure.

FIG. 5 illustrates one example of a social networking system user interface 154 that can be generated by the social networking system 105 and gift application 121. FIG. 5 illustrates how a social networking system user interface 154 can include an application user interface 407 that includes content generated by the gift application 121 via the API 127 as well as content retrieved from the electronic commerce application 119 or any electronic commerce system. In the depicted example, the gift application 121 can, via the social networking system 105 API 127, provide a user interface that allows an initiator to select products available via the electronic commerce application 119 as potential gifts for the recipient of a gift campaign. Additionally, as noted above, the gift application 121 can generate gift recommendations that can be based at least upon attributes of a user profile of the recipient and/or initiator in an electronic commerce system and/or the social networking system 105.

Figure 6:
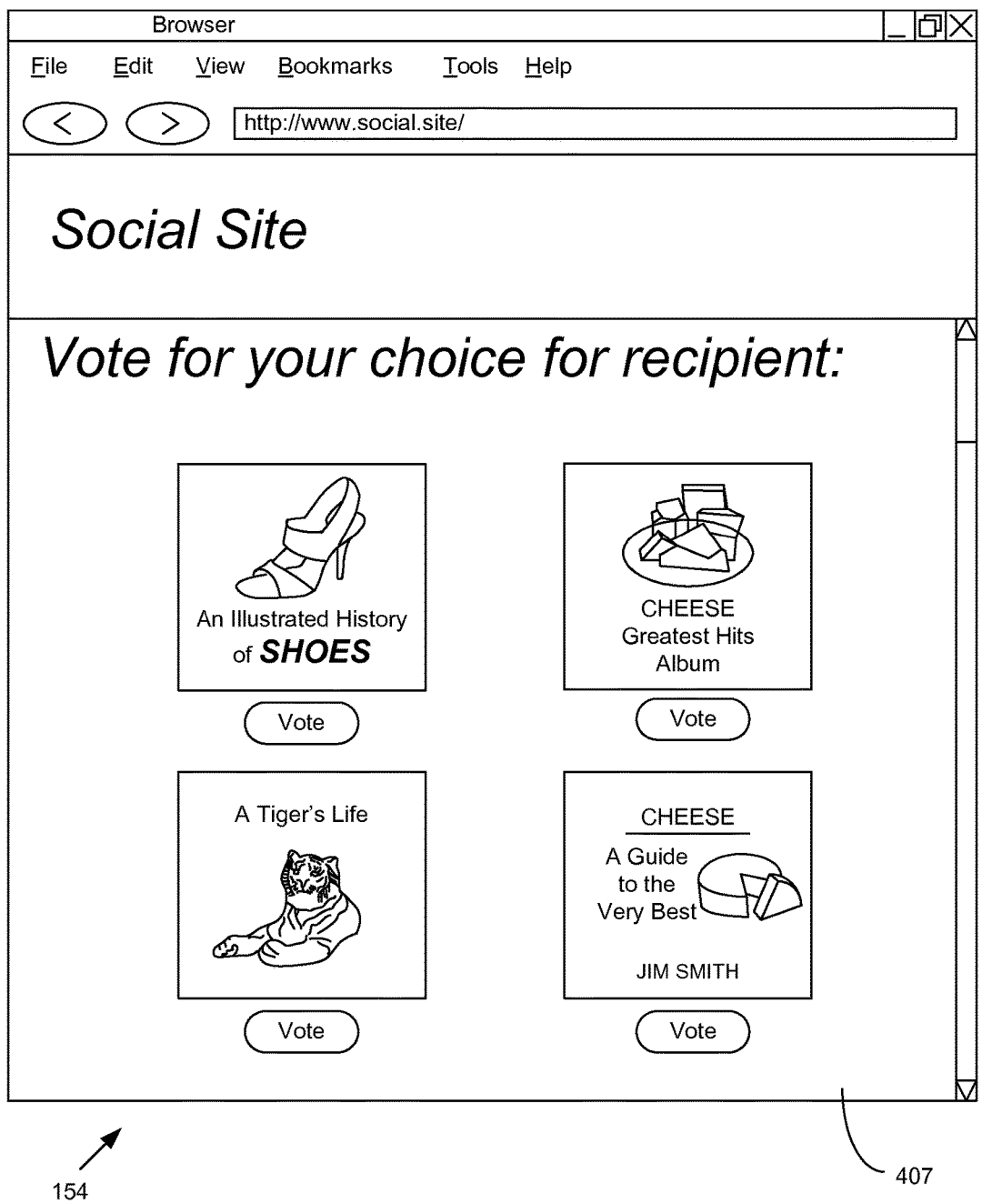
FIG. 6 is a drawing of an example of a social networking user interface rendered by a client in the networked environment of FIG. 1 according to various embodiments of the present disclosure.

FIG. 6 illustrates one example of a social networking system user interface 154 that can be generated by the social networking system 105 and gift application 121. FIG. 6 illustrates an alternative example of one way in which social networking system user interface 154 can include an application user interface 407 that includes content generated by the gift application 121 via the API 127 as well as content retrieved from the electronic commerce application 119 or any electronic commerce system. As described above, the gift application 121 can allow participants of a gift campaign to participate in the selection of a product available via the electronic commerce application 119 as a gift for the recipient.

Figure 7:
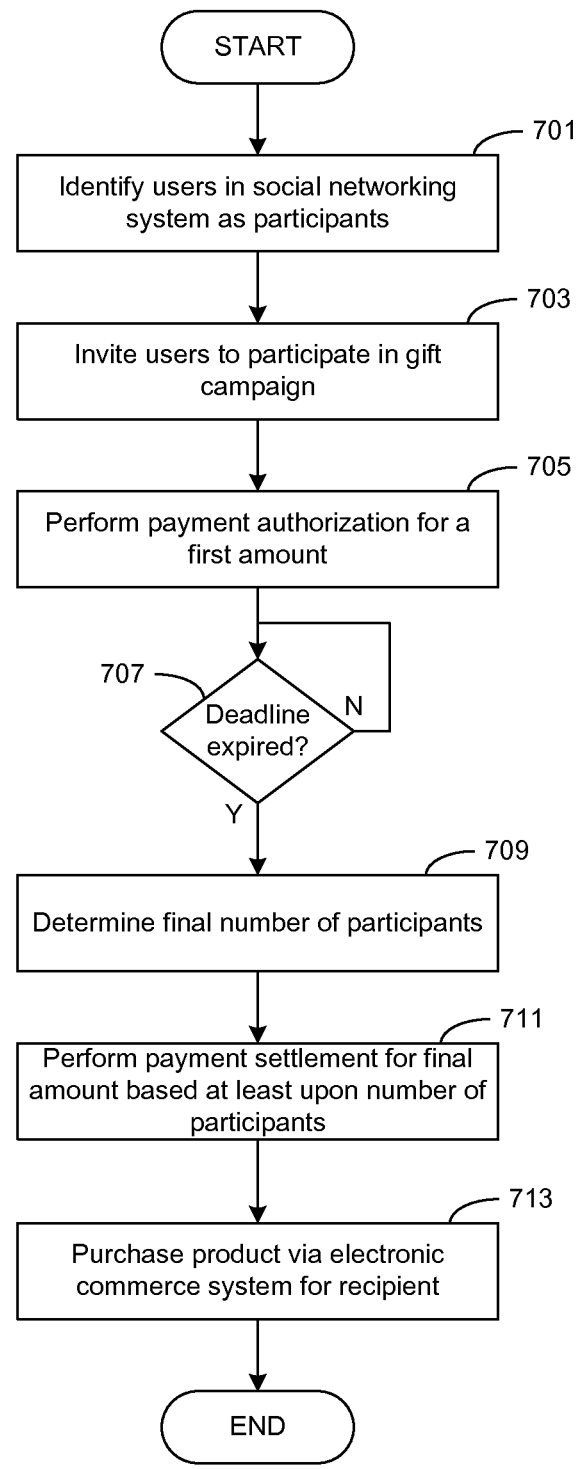
FIG. 7 is a flowchart illustrating one example of functionality implemented as portions of the gift application executed in a computing device in the networked environment of FIG. 1 according to various embodiments of the present disclosure.
Figure 8:
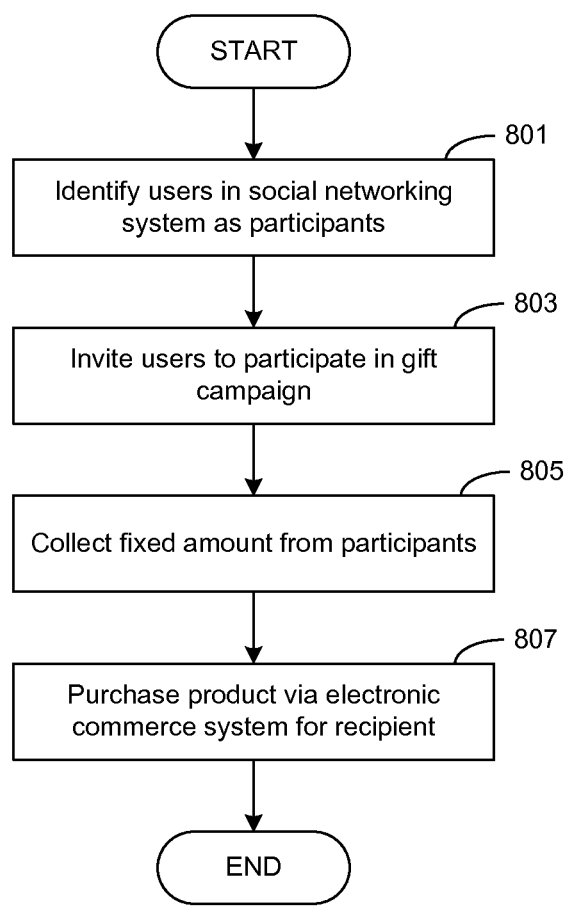
FIG. 8 is a flowchart illustrating one example of functionality implemented as portions of the gift application executed in a computing device in the networked environment of FIG. 1 according to various embodiments of the present disclosure.
Figure 9:
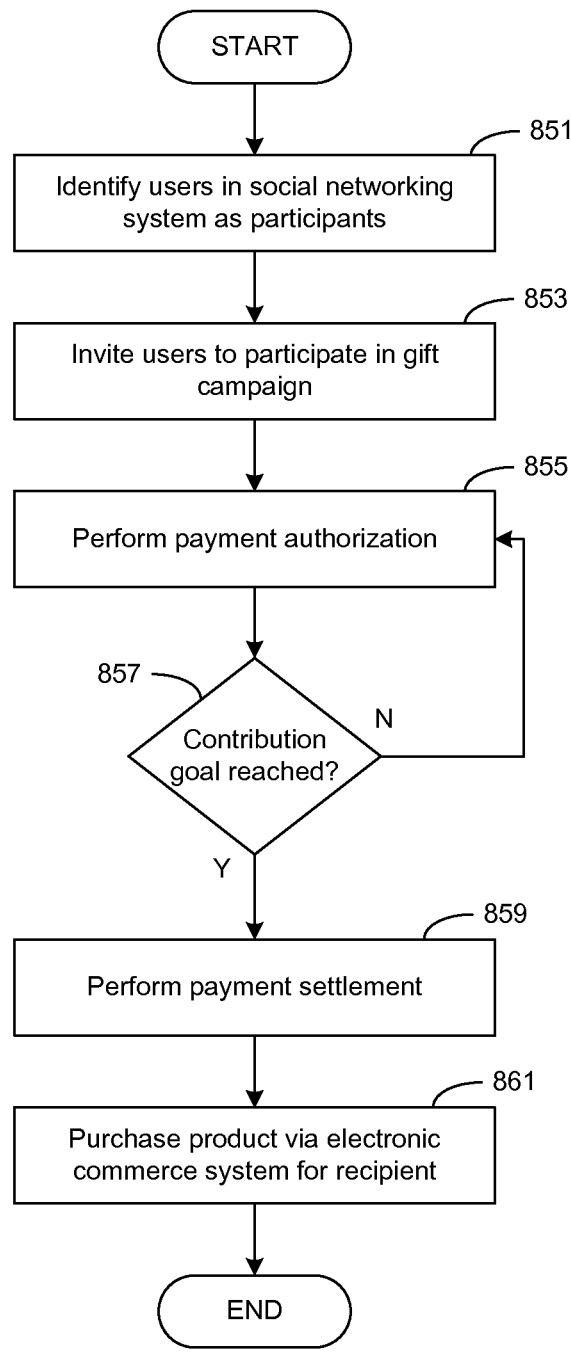
FIG. 9 is a flowchart illustrating one example of functionality implemented as portions of the gift application executed in a computing device in the networked environment of FIG. 1 according to various embodiments of the present disclosure.

Referring next to FIGS. 7-9, shown are flowcharts that provide examples of the operation of a portion of the gift application 121 according to various embodiments. It is understood that the flowcharts of FIGS. 7-9 provide merely examples of the many different types of functional arrangements that may be employed to implement the operation of the portion of the gift application 121 as described herein. As an alternative, the flowcharts of FIGS. 7-9 may be viewed as depicting an example of steps of a method implemented in the computing device 103 (FIG. 1) according to one or more embodiments.

The flowchart of FIG. 7 depicts an example of one way in which the gift application 121 can facilitate a variable contribution gift campaign. In other words, FIG. 7 depicts an example of facilitating a gift campaign where the contribution amount of the participants and/or the initiator depends on a final number of participants who join the gift campaign. As also described above, the functionality of the gift application 121 can be implemented in a social networking system 105 through an API 127 provided by the social networking system 105. Accordingly, beginning with box 701, the gift application 121 can identify users in a social networking system 105 as potential participants in a gift campaign associated with a user designated as the recipient.

In box 703, the gift application 121 can invite potential participants to participate in the gift campaign. As the depicted example illustrates an example of a variable contribution gift campaign, in box 705 the gift application 121 can perform a payment authorization against a payment instrument such as a credit card or debit card, an electronic wallet, or any other payment device for a first amount. The first amount can be a minimum contribution amount designated by the initiator of the gift campaign, or any other amount that has a relation to a product selected by the initiator, a campaign goal selected by the initiator or any other metric as can be appreciated. In box 707 the gift application 121 can determine whether a deadline for potential participants to accept an invitation to participate in the campaign and/or commit funds to the campaign has expired.

If such a deadline has expired, then in box 709 the gift application 121 can determine a final number of participants who have accepted an invitation and/or committed funds to the gift campaign. In box 711, the gift application 121 can perform a payment settlement for a final contribution amount that is based at least upon the final number of participants in the gift campaign. As described above, the funds collected from participants and/or the initiator can be assigned to a gift card and/or other account so that the participants and/or initiator does not have access to the collected funds. Accordingly, in one embodiment, a gift card or other payment device can be provided to the recipient of a gift campaign. In box 713, the gift application can purchase one or more products, which can include a gift card, on behalf of the gift campaign in an electronic commerce system for the recipient of the gift campaign. As described above, the product(s) selected for a recipient can be selected by the initiator of the gift campaign, suggested by the gift application 121, and/or selected with input from participants in the gift campaign.

The flowchart of FIG. 8 depicts an example of one way in which the gift application 121 can facilitate a fixed contribution gift campaign. In other words, FIG. 8 depicts an example of facilitating a gift campaign where the contribution amount of the participants and/or the initiator is fixed and/or designated by the initiator. As also described above, the functionality of the gift application 121 can be implemented in a social networking system 105 through an API 127 provided by the social networking system 105. Accordingly, beginning with box 801, the gift application 121 can identify users in a social networking system 105 as potential participants in a gift campaign associated with a user designated as the recipient.

In box 803, the gift application 121 can invite potential participants to participate in the gift campaign. As the depicted example illustrates an example of a fixed contribution gift campaign, in box 805 the gift application 121 can collect a fixed amount from one or more participants of the gift campaign. In box 807, the gift application can purchase a product on behalf of the gift campaign in an electronic commerce system for the recipient of the gift campaign. As described above the product(s) selected for a recipient can be selected by the initiator of the gift campaign, suggested by the gift application 121, and/or selected with input from participants in the gift campaign.

The flowchart of FIG. 9 depicts an example of one way in which the gift application 121 can facilitate a gift campaign that includes a contribution goal. In the example of FIG. 8, the gift application can impose a contribution goal on a gift campaign, after which the gift campaign can close to new participants. In box 851, the gift application 121 can identify users in a social networking system 105 as potential participants in a gift campaign associated with a user designated as the recipient.

In box 853, the gift application 121 can invite potential participants to participate in the gift campaign. In box 855, the gift application 121 can perform a payment authorization for a first amount for participants committing to contribute funds to the gift campaign. In box 857, the gift application 121 can determine whether a contribution goal has been reached. If the contribution goal has not been reached, the gift application 121 can continue allowing users to commit funds to the gift campaign. Once the contribution goal has been reached, the gift application 121 can close the gift campaign to new participants and perform a payment settlement 859. In box 861, the gift application 121 can facilitate fulfillment of a product via an electronic commerce system for the recipient on behalf of the gift campaign.

Figure 10:
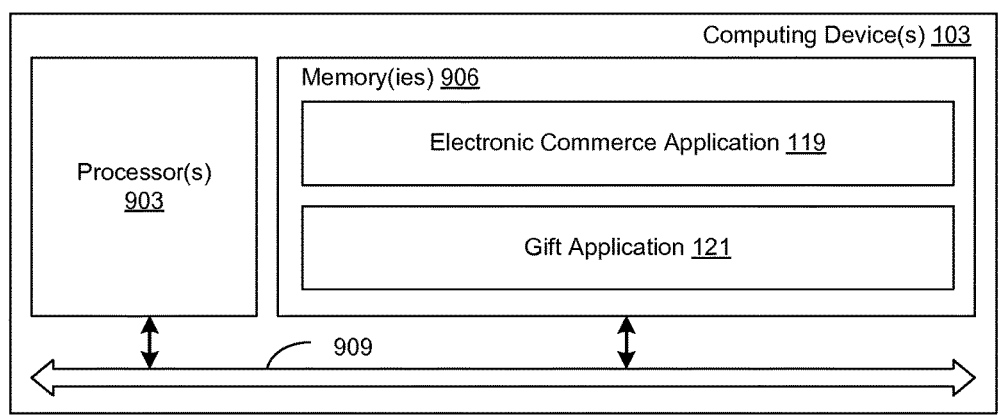
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 903 and a memory 906, both of which are coupled to a local interface 909. To this end, the computing device 103 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the electronic commerce application 119, the gift application 121, and potentially other applications. In addition, an operating system may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network 109 (FIG. 1) that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the electronic commerce application 119, the gift application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7-9 show the functionality and operation of an implementation of portions of the gift application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 7-9 show a specific order of execution, it is understood that the order of execution may differ from that which is depicted. For example, the order of execution of two or more blocks may be scrambled relative to the order shown. Also, two or more blocks shown in succession in FIGS. 7-9 may be executed concurrently or with partial concurrence. Further, in some embodiments, one or more of the blocks shown in FIGS. 7-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium comprising a plurality of computer instructions executable by at least one computing device, wherein the plurality of computer instructions, when executed, cause the at least one computing device to at least:
   identify a user of a social networking system that is associated with a recipient for a gift campaign;
   generate an invitation for the user to participate in the gift campaign;
   prevent generation of an invitation for a particular user to participate in the gift campaign based at least in part on the user of the social networking system lacking a connection to the particular user;
   perform image recognition analysis on published content associated with the recipient in the social networking system;
   identify an object represented in the published content;
   determine that a product available through an electronic commerce system is associated with the object represented in the published content;
   identify the product available through the electronic commerce system as a suggested gift for the gift campaign;
   populate content in a user interface container for a network page for the social networking system, wherein the content represents at least the product;
   obtain a selection of the product made via the content in the user interface container; and
   perform a transaction via the electronic commerce system to order the product for the recipient.

2. The non-transitory computer-readable medium of claim 1, wherein the plurality of computer instructions further cause the at least one computing device to at least communicate with the social networking system using an application programming interface.

3. The non-transitory computer-readable medium of claim 1, wherein the plurality of computer instructions further cause the at least one computing device to at least populate the user interface container with the content via an application programming interface.

4. The non-transitory computer-readable medium of claim 1, wherein the plurality of computer instructions further cause the at least one computing device to identify the user by at least detecting that the user has a social networking link with the recipient for the gift campaign.

5. The non-transitory computer-readable medium of claim 1, wherein the plurality of computer instructions further cause the at least one computing device to identify the user by at least detecting that the user and the recipient for the gift campaign are associated with a social networking group.

6. The non-transitory computer-readable medium of claim 1, wherein the plurality of computer instructions further cause the at least one computing device to identify the product as the suggested gift based at least upon an attribute of a profile associated with the recipient.

7. The non-transitory computer-readable medium of claim 1, wherein the plurality of computer instructions further cause the at least one computing device to at least:
   determine a deadline has passed for potential participants to accept the invitation; and
   perform a payment settlement for a final contribution amount based at least in part on a final number of participants in the gift campaign.

8. A system, comprising:
   at least one computing device; and
   memory storing a plurality of computer instructions executable by the at least one computing device, where the plurality of computer instructions cause the at least one computing device to at least:
      identify a user of a social networking system that is associated with a recipient for a gift campaign;
      perform image recognition analysis on published content associated with the recipient in the social networking system;
      identify an object represented in the published content;
      determine that a product available through an electronic commerce system is associated with the object represented in the published content;
      generate an invitation for the user to participate in the gift campaign;
      generate content for a user interface container for a network page for the social networking system, wherein the product is represented in the content;
      obtain a selection of the product made via the content in the user interface container;
      determine a deadline has passed for potential participants to accept the invitation;
      perform a transaction via the electronic commerce system to order the product for the recipient; and
      perform a payment settlement for a final contribution amount based at least in part on a final number of participants in the gift campaign.

9. The system of claim 8, wherein the plurality of computer instructions further cause the at least one computing device to at least communicate with the social networking system using an application programming interface provided by the social networking system.

10. The system of claim 8, wherein the network page for the social networking system comprises first content generated by the social networking system and second content generated by the electronic commerce system.

11. The system of claim 8, wherein the plurality of computer instructions further cause the at least one computing device to at least identify the product as a recommended gift for the recipient for the gift campaign.

12. The system of claim 8, wherein the plurality of computer instructions further cause the at least one computing device to at least identify the product as a suggested gift for the recipient based at least upon an attribute of a profile associated with the recipient.

13. The system of claim 8, wherein the plurality of computer instructions further cause the at least one computing device to populate the user interface container for the network page by at least communicating via an application programming interface.

14. The system of claim 8, wherein the plurality of computer instructions further cause the at least one computing device to at least prevent generation of an invitation for a particular user to participate in the gift campaign based at least in part on the user of the social networking system lacking a connection to the particular user.

15. A method, comprising:
- identifying, by at least one computing device, a user of a social networking system that is associated with a recipient for a gift campaign;
- performing, by the at least one computing device, image recognition analysis on published content associated with the recipient in the social networking system;
- identifying, by the at least one computing device, an object represented in the published content;
- determining, by the at least one computing device, that a product available through an electronic commerce system is associated with the object represented in the published content;
- transmitting, from the at least one computing device, an invitation for the user to participate in the gift campaign;
- preventing, by the at least one computing device, generation of an invitation for a particular user to participate in the gift campaign based at least in part on the user of the social networking system lacking a connection to the particular user;
- identifying, by the at least one computing device, the product as a suggested gift for the gift campaign;
- generating, by the at least one computing device, content for a network page for the social networking system, wherein the network page comprises a user interface container in which the product is represented;
- obtaining, by the at least one computing device, a selection of the product made via the user interface container; and
- performing, by the at least one computing device, a transaction via the electronic commerce system to order the product for the recipient.

16. The method of claim 15, further comprising communicating, by the at least one computing device, with the electronic commerce system via an application programming interface.

17. The method of claim 15, wherein identifying the user of the social networking system comprises determining that the user is associated with an initiator of the gift campaign.

18. The method of claim 15, wherein identifying the user of the social networking system comprises determining that the user is linked to the recipient for the gift campaign in the social networking system.

19. The method of claim 15, wherein identifying the user of the social networking system comprises determining that the user and the recipient for the gift campaign are associated with a social networking group.

20. The method of claim 15, wherein identifying the user of the social networking system comprises determining that the user and the recipient for the gift campaign are linked with another user in the social networking system.

* * * * *